US010317108B2

(12) United States Patent
Nielsen (10) Patent No.: US 10,317,108 B2
(45) Date of Patent: Jun. 11, 2019

(54) SOLAR UNIT ASSEMBLY AND A METHOD FOR CONSTRUCTING SUCH AN ASSEMBLY (71) Applicant: Alpha-E ApS, Fredericia (DK)

(72) Inventor: Stig Kejser Nielsen, Fredericia (DK)

(73) Assignee: Alpha-E ApS, Federicia (DK)

( * ) Notice: Subject to any disclaimer, the term of this patent is extended or adjusted under 35 U.S.C. 154(b) by 913 days.

(21) Appl. No.: 14/767,944

(22) PCT Filed: Feb. 24, 2014

(86) PCT No.: PCT/DK2014/050038
§ 371 (c)(1),
(2) Date: Aug. 14, 2015

(87) PCT Pub. No.: WO2014/131419
PCT Pub. Date: Sep. 4, 2014

(65) Prior Publication Data
US 2015/0377516 A1 Dec. 31, 2015

(30) Foreign Application Priority Data
Feb. 26, 2013 (DK) .................................. 2013 70109

(51) Int. Cl.
*F24S 23/74* (2018.01)
*F24S 25/10* (2018.01)
*F24S 25/00* (2018.01)
*F24S 25/13* (2018.01)

(52) U.S. Cl.
CPC .............. *F24S 23/74* (2018.05); *F24S 23/745* (2018.05); *F24S 25/00* (2018.05); *F24S 25/10* (2018.05); *F24S 25/13* (2018.05); *Y02B 10/20* (2013.01); *Y02E 10/45* (2013.01); *Y02E 10/47* (2013.01)

(58) Field of Classification Search
CPC .......... F24S 23/74; F24S 23/745; F24S 23/10; F24S 23/13
USPC ......................................................... 126/693
See application file for complete search history.

(56) References Cited

U.S. PATENT DOCUMENTS

| 3,924,604 | A | * | 12/1975 | Anderson | ............... F16C 32/00 |
| | | | | | 126/606 |
| 4,326,773 | A | | 4/1982 | Colas | |
| 4,423,719 | A | | 1/1984 | Hutchison | |
| 4,515,148 | A | | 5/1985 | Boy-Marcotte et al. | |
| 2006/0193066 | A1 | | 8/2006 | Prueitt | |
| 2008/0308094 | A1 | | 12/2008 | Johnston | |
| 2009/0194657 | A1 | | 8/2009 | Vazquez et al. | |

(Continued)

FOREIGN PATENT DOCUMENTS

| DE | 202009005056 | 10/2009 | |
| DE | 102011101082 B4 * | 12/2012 | ............... G02B 5/09 |

(Continued)

OTHER PUBLICATIONS

International Search Report for Corresponding PCT Application No. PCT/DK2014/050038, dated Jun. 2, 2014.

Primary Examiner — Avinash A Savani
(74) Attorney, Agent, or Firm — MKG LLC (57) ABSTRACT The present invention relates to a solar unit assembly adapted for reflecting light onto a receiver, comprising a plurality of solar collector units, a primary support element, a plurality of secondary support elements, and two side support elements. The invention furthermore relates to a method of providing such a solar unit assembly.

16 Claims, 8 Drawing Sheets (56) References Cited

U.S. PATENT DOCUMENTS

| | | | | |
|---|---|---|---|---|
| 2010/0154888 A1* | 6/2010 | Kadi | ................. | F24S 23/74 |
| | | | | 136/259 |
| 2010/0313933 A1 | 12/2010 | Xu | | |
| 2011/0000479 A1 | 1/2011 | Gonzalez | | |
| 2015/0146314 A1* | 5/2015 | Niemeyer | ................. | G02B 5/09 |
| | | | | 359/853 |

FOREIGN PATENT DOCUMENTS

| | | |
|---|---|---|
| EP | 0338051 A1 | 10/1989 |
| ES | 1070880 | 11/2009 |
| WO | 2007096158 A1 | 8/2007 |
| WO | 2009004476 A2 | 1/2009 |
| WO | 2012025849 A2 | 3/2012 |
| WO | 2012089870 A1 | 7/2012 |
| WO | 2012111008 A1 | 8/2012 |
| WO | 2013014998 A1 | 1/2013 |
| WO | 2013026456 A1 | 2/2013 |

* cited by examiner

SOLAR UNIT ASSEMBLY AND A METHOD FOR CONSTRUCTING SUCH AN ASSEMBLY

BRIEF DESCRIPTION

The present invention relates to a solar unit assembly adapted for reflecting light onto a receiver, including a plurality of solar collector units, a primary support element, a plurality of secondary support elements, and two side support elements. The invention furthermore relates to a method of providing such a solar unit assembly.

BACKGROUND

For many years, renewable and alternative sources of energy have been explored to a large extent, and during recent years, there has been an ever increasing awareness of the overall energy generation and consumption prompted in particular by global climate change concerns and higher prices on traditional resources such as oil.

One such renewable source is solar energy. Solar energy utilizes the radiation from the sun to generate heat or power, basically either by generating electrical power directly, i.e. by converting the solar radiation into direct current electricity using photovoltaic solar panels comprising a number of solar cells containing a photovoltaic material, or by means of solar thermal collectors to utilize the thermal energy to generate heat, for instance for residential heating purposes, for evaporation of liquids (distillation) or to generate electricity by heating water or another heat transfer fluid to produce steam which in turn drives a turbine coupled to an electrical power generator.

One way of obtaining very high temperatures and thus an efficient utilization of the solar thermal energy is concentrated solar power (CSP) systems, which fundamentally use mirrors or lenses to concentrate a large area of sunlight, i.e. solar thermal energy, onto a small area.

Concentrating technologies exist in four basic types, viz. solar collectors in the form of parabolic troughs, dish mirrors, concentrating linear Fresnel reflectors, and plane solar collectors directed towards a solar power tower. CSP has recently been widely commercialized and has gained a substantial market share of the renewable sources. Of the CSP plants world-wide, parabolic-trough plants account for major part.

In principle, a solar thermal energy collector comprising a parabolic trough consists of a linear parabolic reflector that concentrates radiation onto a receiver positioned along the focal line of the reflector. The receiver is a tube positioned directly above the middle of the parabolic mirror and filled with a heat transfer fluid. The parabolic trough is usually aligned on a north-south axis, and rotated to track the sun as it moves, or the trough can be aligned on an east-west axis, which reduces the need for tracking but reduces the overall efficiency of the collector.

The parabolic trough reflector is traditionally formed as an elongated parabolic mirror which is carried by a support structure. The mirror is traditionally made up of glass, which has excellent reflecting and stability properties. However, glass has some disadvantages. For instance, it is fragile, meaning that particular precautions must be taken during manufacture, transportation and installation. Furthermore, the weight of such mirrors is substantial, which poses great demands on the support structure, and the overall costs of manufacture, transportation, installation, and maintenance of the system are relatively high.

In the prior art, attempts have been made to provide alternatives to such assemblies of parabolic mirrors. Examples are shown in US published patent applications No. 2010/0313933 and EP patent No. 338 051. Another example is given in for instance US published patent application No. US 2006/0193066 A1, which suggests the formation of reflective cones as an alternative to solar collectors in the form of parabolic troughs and dish mirrors. One of the advantages associated with the particular design mentioned in this document is that the considerable stability required constructing and maintaining parabolic troughs and mirror dishes may be avoided. However, the efficiency of a parabolic trough or mirror dish is considerably larger than with the solar collector suggested in this document.

In known plants, reflectors made of aluminium sheet are used to reduce weight. However, the reflecting properties of aluminium are lower than those of glass; furthermore, as such solar collectors are exposed to weathering at all times, bare aluminium needs frequent cleaning and polishing in order to retain its reflecting properties.

Document WO 2007/096158 A1 describes a self-supporting support structure in the form of hollow chamber profiles carrying on its front face a parabolic concentrator reflector. The support structure is provided as profiles that are extruded, strand-drawn or roll-formed. Similarly, US2008308094 describes a method of providing a self supporting trough-type solar unit where the supporting structure of transverse ribs surrounding the reflective element. Although this design alleviates many of the disadvantages of other alternative assemblies, such design is not very flexible in and hence there is still room for improvement with regard to ease of production, transportation, installation, flexibility of size, maintenance and also very much the utility rate of reflector units.

SUMMARY

In view of the foregoing it is an object to provide a solar unit assembly, which is more flexible, cost-effective and versatile, without compromising the precision and which may be easily assembled both at the site of production and the site of utilization.

In a first aspect, this and further objects are achieved, as outlined in the claims, in that the primary support element is attached solely to a first row of one or more solar collector units extending in the longitudinal direction and to the side support elements.

By attaching the primary support element only to the solar collector units of the first row, sufficient stability is surprisingly achieved in order to ascertain that the receiver is held stably without deviations along the longitudinal direction, whereas some flexibility is allowed in remaining rows of solar collector units without compromising the precision of the concentrator. That is by the structure provided, reinforcing structures in the juxtaposed directions can be omitted so that the only transverse stability element is the side support elements. In this way, a new approach to supporting solar collector units has been taken. Rather than providing the same support over the entire area, it is now possible to optimize the support and this without mitigating the accuracy of the solar collector unit which in tests have shown a 99.6% accuracy.

In another aspect of the invention is provided a method for constructing a solar unit assembly comprising the steps defined in the following description and appended claims, including, a method of constructing a solar unit assembly (1) including the steps of: a) forming a plurality of solar collector units (2) each being provided by the steps of providing a substrate, providing a reflective surface on the substrate to form a reflector element (21), providing a support structure (22) comprising a predefined number of profiles, adapting the shape of the reflector element (21), and fixing the shape of the reflector element (21) by connecting the support structure (22) to the reflector element to provide a solar collector unit (2); b) providing a primary support element (5), a plurality of secondary support elements (6) and two side support elements (7), c) connecting the side support elements (7) on a grounded element, such as a concrete foundation mounted with pylons; d) connecting the primary support element (5) to the side support elements (7); e) connecting the plurality of secondary support elements (6) to the side support elements (7); f) attaching a first plurality of solar collector units (2) to the primary support element (5) in a first row in order to cover the full length of the primary support element in a longitudinal direction; g) attaching a second plurality of solar collector units (2) to the plurality of secondary support elements (6) a second, third, fourth . . . row in order to cover the full length of the secondary support elements (5) and to define an arcuate direction; to provide the solar unit assembly (1).

Further details are described, and further advantages stated, in the description of particular embodiments of the invention.

BRIEF DESCRIPTION OF THE DRAWINGS

In the following the invention will be described in further detail by means of examples of embodiments with reference to the schematic drawings, in which.

DETAILED DESCRIPTION

Figure 1:
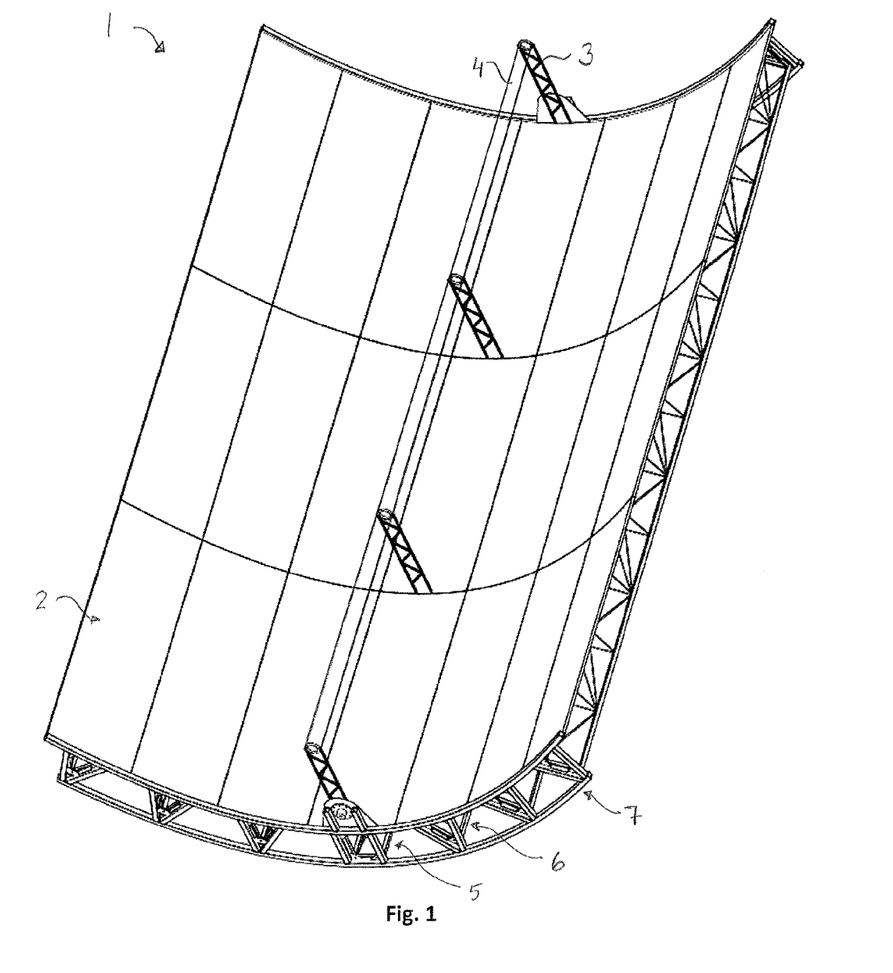
FIG. 1 shows a perspective view of an embodiment of a solar unit assembly according to the invention.
Figure 2:
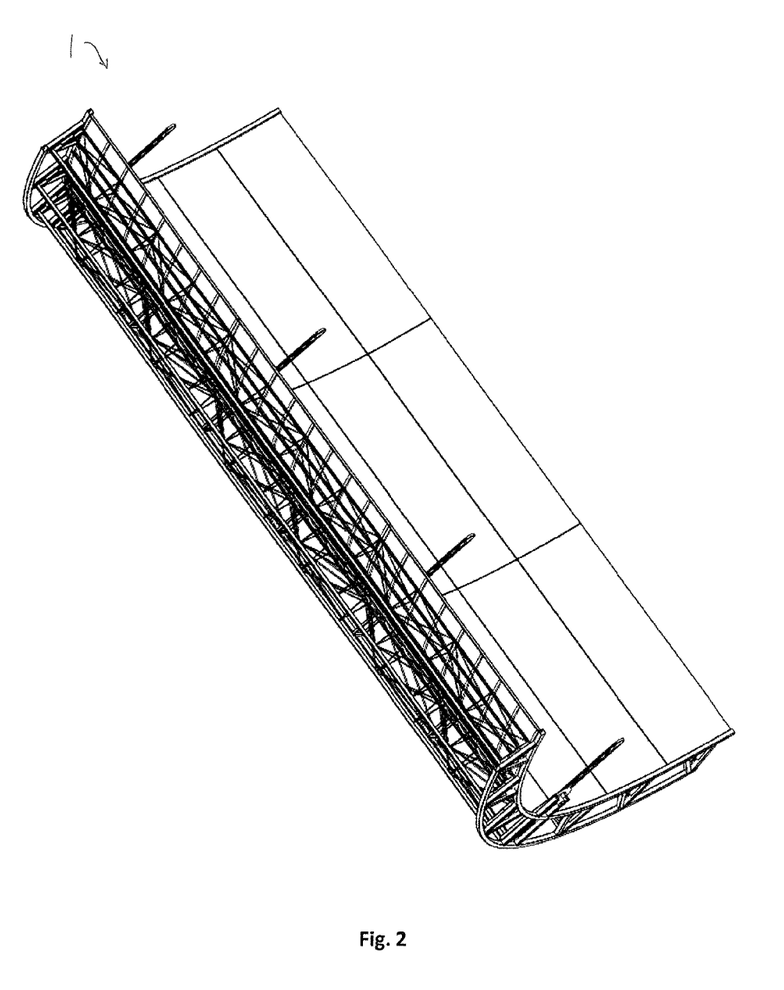
FIG. 2 shows a perspective view of the solar unit assembly of FIG. 1 from another angle.
Figure 3:
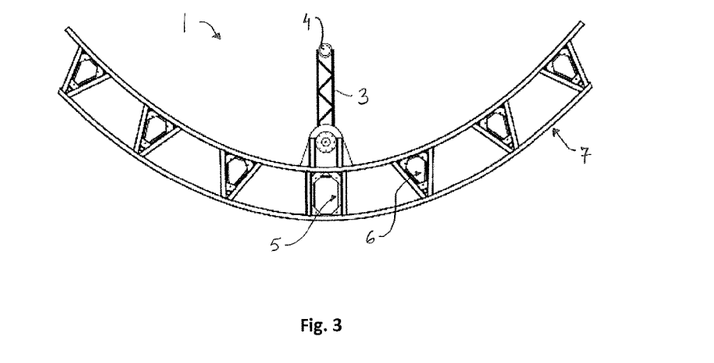
FIG. 3 shows a side view of the solar unit assembly of FIGS. 1 and 2.
Figures 4, 5:
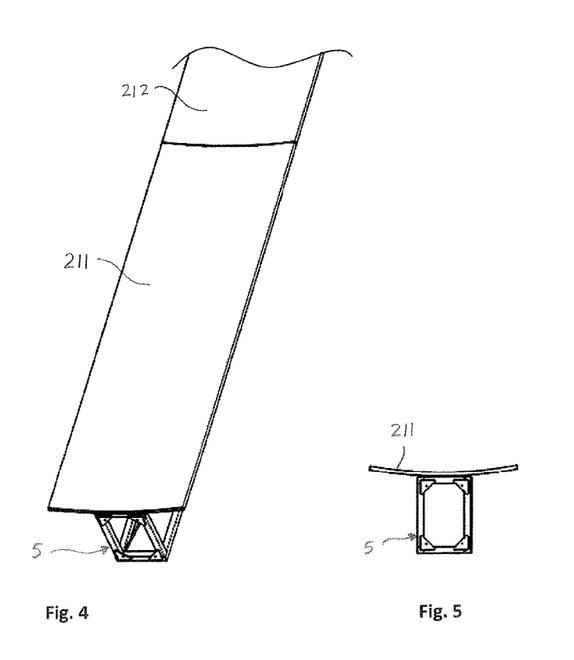
FIG. 4 shows a partial perspective view, on a larger scale, of a detail of the solar unit assembly of FIGS. 1 to 3, namely the primary support element connected to a solar collector unit of a first row.
FIG. 5 shows a partial side view of the detail of FIG. 4.
Figure 6:
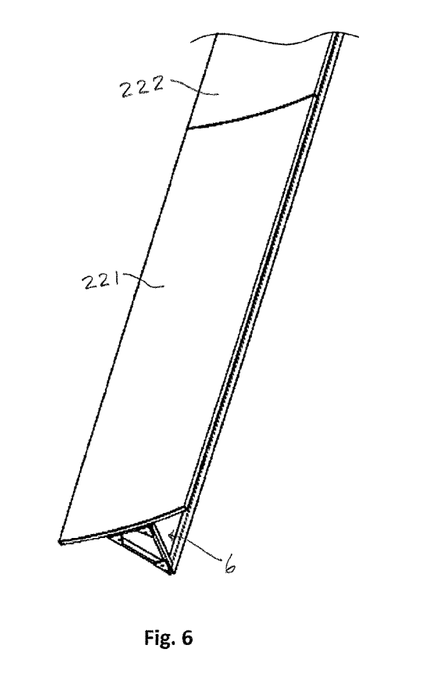
FIGS. 6 and 7 show views corresponding to FIGS. 4 and 5, respectively, of another detail of the solar unit assembly, namely the secondary support element connected to a solar collector unit of a second row.
Figure 7:
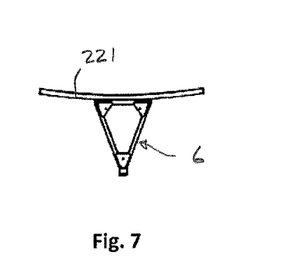

In the drawing, an embodiment of a solar unit assembly 1 according to the invention is shown. The assembly 1 typically forms part of a solar energy plant including energy generation and storage means, control systems etc, not shown. Referring in particular to FIG. 1, the assembly 1 includes a plurality of solar collector units 2 mounted on a carrying or support frame including a primary support element 5, a plurality of secondary support elements 6 and a side support element 7 at each longitudinal end of the assembly 1.

In the configuration shown, the assembly 1 includes a total of 21 solar collector units 2 of which seven solar collector units 2 are positioned in juxtaposition to each other in an arcuate direction, a, projecting on a width and height direction, y, z, and three solar collector units 2 in a longitudinal direction, x.

Figure 11:
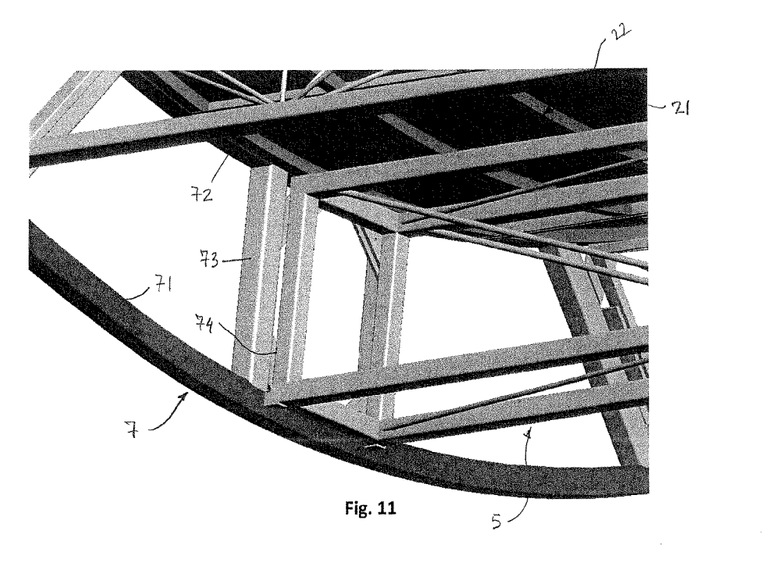
FIGS. 11-14 show partial perspectives of details of the support structures on a larger scale.
Figure 13:
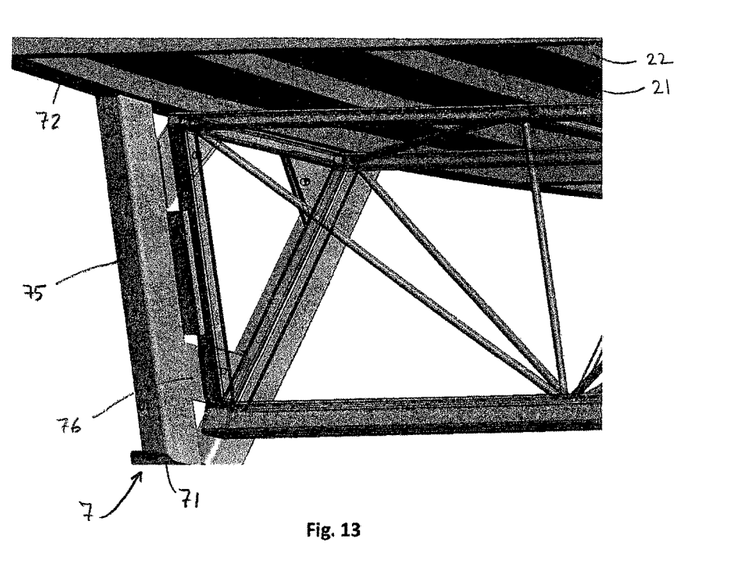
Figure 14:
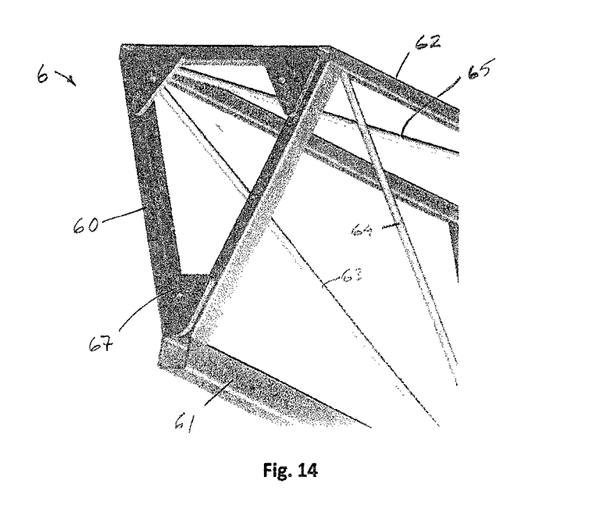

In the following, only one solar collector unit 2 will be described in detail; other solar collector units of a plant may be designed in a similar or modified manner. It is also to be understood that a single solar collector unit 2 may constitute a solar energy plant in itself, for instance for the household field of use. Furthermore, the solar collector unit may also be used as a repair unit. Each solar collector unit 2 is produced to have a predefined parabolic shape. In the embodiment shown, each solar collector unit 2 includes a reflector element 21 formed by a substrate and a reflective surface provided on the substrate, said reflective surface may be a high reflective film from 3M® (such as 3M SMF 1.100 films) or ReflecTech® mirror films, and said solar collector element further including a support structure generally comprising a predefined number of profiles 22 connected to the reflector element at a distance from each other, cf. FIGS. 11 and 13, preferably the number of profiles per 2000 mm is 3 to 12, more preferred 4 to 10 and even more preferred 5 to 8. The profiles serve to ensure the parabolic nature of the solar collector units Details regarding the construction of the solar collector units 2 are the subject of Applicant's international application No. PCT/DK2012/050308. Generally, the solar collector units 2 have an average weight of app. 5 Kilos per square meter.

In the focus line of the parabola, a receiver 4 is arranged and mounted to the carrying or support frame of the assembly 1 by means of holding arms 3. The receiver 4 is adapted to accommodate a heat transfer fluid, such as water for consumption or for evaporation, in a manner known per se.

The entire solar collector unit 2 is connected to carrying frame 1 either by mechanical or adhesive means, or by a combination. Suitable adhesive connections include the use of for instance 3M™ Scotch-Weld™ 7271 B/A. Mechanical connection is also conceivable and may for instance include clamping devices. Furthermore, the solar collector units may be connected to each other in any suitable manner.

In the following, the construction of the elements forming part of the carrying or support frame will be described in detail.

Thus, the receiver 4 is connected to the primary support element 5, thus at the position giving the maximum protection against torsion and bending that might otherwise bring the receiver out of alignment.

In turn, the primary support element 5 is attached solely to the first row of one or more solar collector units 211, 212, 213 extending in the longitudinal direction and to the side support elements 7.

Figure 15:
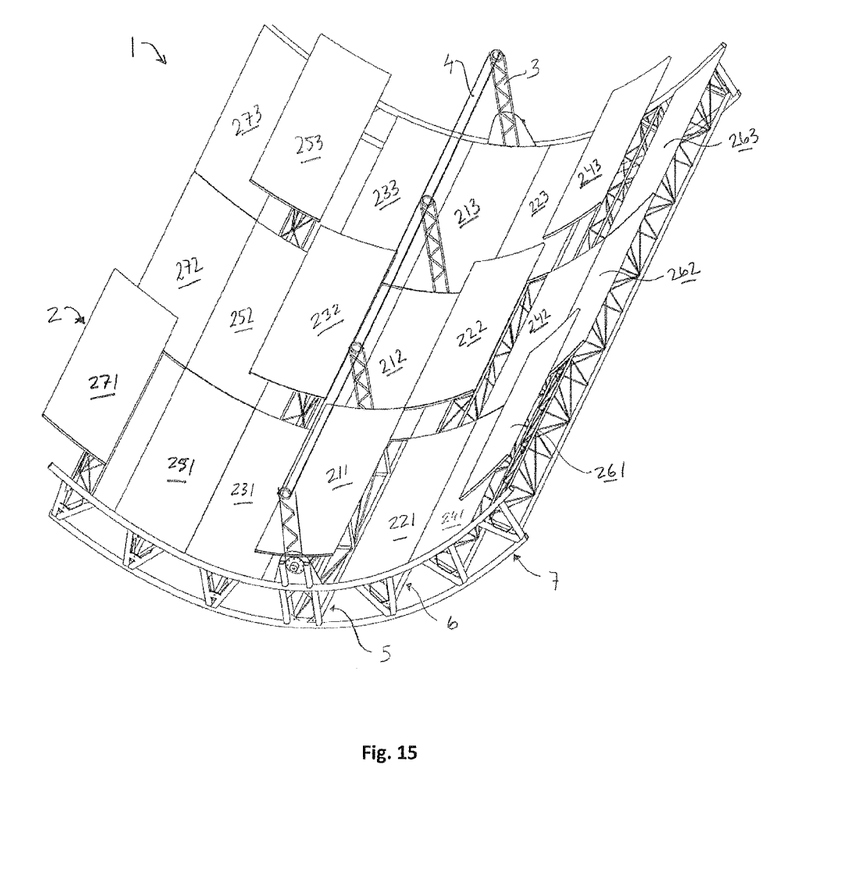
FIG. 15 is a perspective view corresponding to FIG. 1 illustrating a method of constructing the assembly.

In the remaining rows of solar collector units 221, 222, 223; 231, 232, 233 . . . 271, 272, 273, one secondary support element 6 is attached to a respective row of one or more solar collector units and to the side support elements 7 as is illustrated i.a. in FIG. 15.

Figure 12:
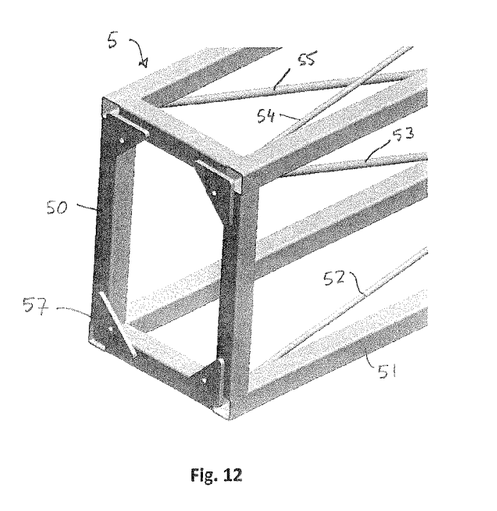

In order to withstand the demands to torsional strength and resistance to bending, the primary support element 5 is of a robust structure. In the embodiment shown, the primary support element 4 includes two end sections 50 and is substantially rectangular in cross-section, in that four beams 51 extend in the longitudinal direction between the end sections 50. The primary support element 5 is reinforced by one or more intermediate sections 56 and a number of stay elements 51, 52, 53, 54 extending between one end section 50 and the adjacent intermediate section 56 and between the intermediate sections 56. In order to provide connection to the side support element 7 at either longitudinal side, the primary support element 5 is provided with engagement means adapted to cooperate with a respective side support element 7, in the embodiment shown in the form of flanges 57 provided on the respective end section 50, as shown in FIG. 12. The elements are connected to each other by any suitable means, for instance bolts or clamping devices.

The length of the primary support element 5 is adapted to the total length of the solar collector units 211, 212, 213 of the first row. In the actual embodiment, each solar collector unit has a uniform length of approximately 4 m and an arcuate dimension of approximately 1.3 m, and hence, the length of the primary support element 5 is approximately 12 m. At this length, the weight of the primary support element 5 is approximately 500 kg.

As to the secondary support element 6, it includes two end sections 60 and is substantially triangular in cross-section. The triangular cross-section is obtained in that each secondary support element 6 includes one beam 61 forming an apex beam and two beams 62 forming base beams, the base beams 62 being adapted to face the solar collector panel 221 in the installed condition, cf. FIG. 13. Sufficient strength is obtained, in the embodiment shown, in that secondary support element 6 furthermore includes one or more intermediate sections 66 and a number of stay elements 63, 64, 65 extending between the end sections 60 at either end, and the adjacent intermediate section 66, and between intermediate sections 66. Connection to the side support elements 7 at either side is obtained in that the secondary support element 6 is provided with engagement means adapted to cooperate with a respective side support element 7, here in the form of flanges 67 provided on the respective end section 60. As for the primary support element 5, the elements are connected to each other by any suitable means, for instance bolts or clamping devices.

The length of the secondary support elements 6 is adapted to the total length of the solar collector units 221, 222, 223 of the second row and in any further rows. In the actual embodiment, the length of each primary support element 6 is approximately 12 m. At this length, the weight of the secondary support element 6 is approximately 200 kg. It is contemplated that the secondary elements may have other suitable dimensions such as the same dimension as the primary support element. However, the triangular structure is preferred since the weight of the total structure is reduced and this without compromising the stability and precision of the final unit.

The length of the primary and secondary support elements 5, 6, i.e. approximately 12 m, provides a good compromise between ease of installation with few parts and manageable length. A length of 12 m will thus be able to be transported by usual means, such as lorries and containers. However, the length may be any suitable length and the invention should not be limited to the length illustrated.

Figure 8:
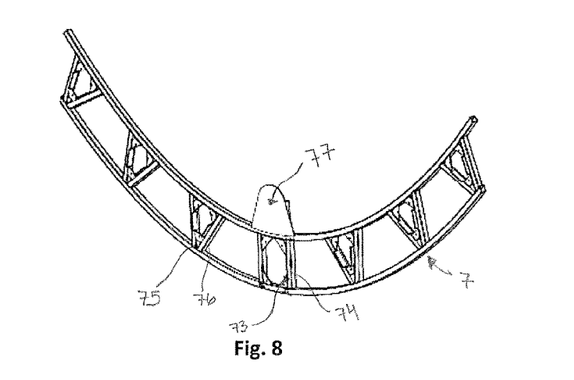
FIG. 8 shows a perspective view of the side support element.
Figure 9:
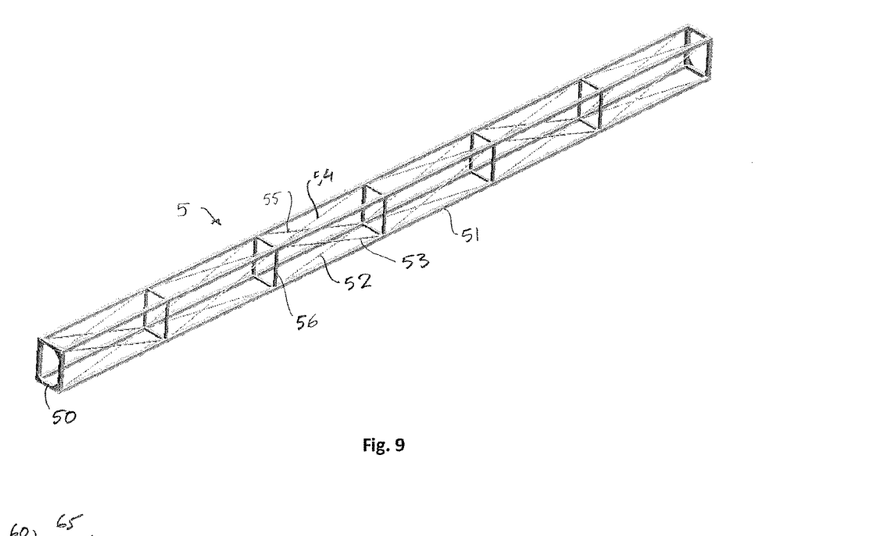
FIGS. 9 and 10 show perspectives of the primary and secondary support elements respectively.
Figure 10:
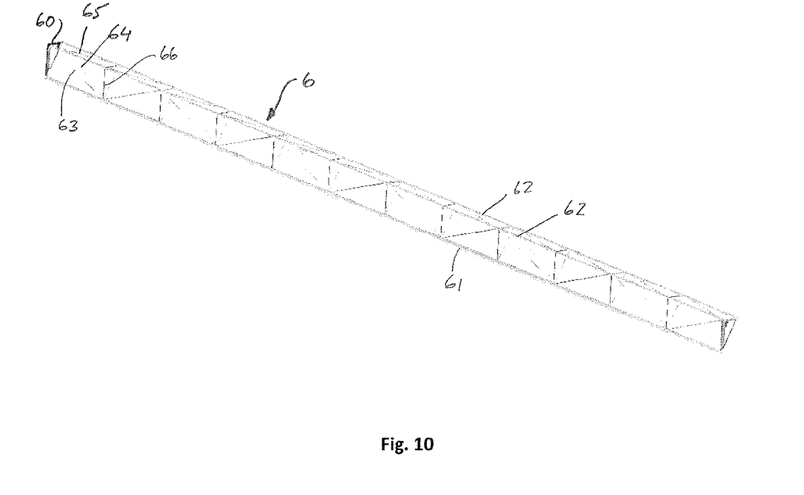

In order to provide for easy and reliable connection between the longitudinally extending primary and secondary support elements 5, 6 and the side support elements 7, each side support element 7 includes, in the embodiment shown, at least one, here two, arcuate beams 71, 72, and one primary engagement member 73, 74 adapted to cooperate with the primary support element 5 and a set of secondary engagement members 75, 76 adapted to cooperate with a respective secondary support element 6. Referring in particular to FIG. 8, and to FIGS. 11 and 13, respectively, the primary engagement member includes a rectangular beam structure 73 and four flanges 74, and each secondary engagement member includes a triangular beam structure 75 and three flanges 76. Furthermore, each side support element 7 is provided with an upstanding plate element 77 adapted to provide connection to the outermost holding arms 3 supporting the receiver 4. The holding arms 3 are mounted directly to the primary support element 5.

Due to the optimized structure of the carrying or supporting frame, the primary support element 5 should have a torsional strength and bending resistance that are substantially larger than that of the secondary support element(s) 6, for instance in the range 1.5:1 to 3:1, preferably 2:1, for instance at least two times the corresponding values for the secondary support element 6.

By this structure, it is possible to increase the number of rows of the solar unit assembly. With traditional structures, the rows will most often be limited to three, four or five, thus setting an upper limit of the span, the overall area of reflecting surface per length unit, and consequently on the energy concentrated in the receiver 4. Depending on the field of application of the solar unit assembly, the number of rows lies in the interval 2 to 11, preferably 5 to 9, such as 5, 6, 7, 8 or 9. The larger number of solar collector units, thus here 21 solar collector units over a length of only 12 m, makes it possible to either provide shorter plants, or to increase the temperature of the heat transfer fluid inside the receiver 4, for instance even up to 450 or 550° C., which makes it possible to increase the efficiency of systems downstream from the solar unit assembly in such a plant.

The construction of the solar unit assembly may in principle take place in any suitable manner and order of steps. A preferred method, however, comprises the steps of: a) forming a plurality of solar collector units each being provided by the steps of: providing a substrate, providing a reflective surface on the substrate to form a reflector element, providing a support structure comprising a predefined number of profiles, adapting the shape of the reflector element, and fixing the shape of the reflector element by connecting the support structure to the reflector element to provide a solar collector unit, b) providing a primary support element 5, a plurality of secondary support elements 6 and two side support elements 7, c) connecting the side support elements 7 on a grounded element, such as a concrete foundation mounted with pylons; d) connecting the primary support element 5 to the side support elements 7; e) connecting the plurality of secondary support elements 6 to the side support elements 7; f) attaching a first plurality of solar collector units to the primary support element 5 in a first row in order to cover the full length of the primary support element in a longitudinal direction; g) attaching a second plurality of solar collector units to the plurality of secondary support elements 6 a second, third, fourth etc. row in order to cover the full length of the secondary support elements and to define an arcuate direction; to provide the solar unit assembly.

It is contemplated that the order of the steps e) and f) can be reversed so that the solar collector units are attached to the first support structure before the secondary support structures are attached.

It is also contemplated that additional rows of secondary support structures and corresponding solar collector units may be added after an initial construction of a solar unit assembly so that the capacity can be increased if desired. Increasing the number of secondary support structures and corresponding solar collector units does not compromise the stability of the structure neither does it mitigate the precision and accuracy of the reflection. Rather, the addition of additional rows of secondary structures increases the efficiency and hence the temperature of the fluid.

The individual parts of the solar unit assembly can be flexibly assembled at any site in order to optimize the manufacture and transportation of the parts constituting the assembly.

Since each element is very light and the assembling is very simple it is possible to build up to 500.000 m² solar fields in less than a year using only a small team of workers using forklifts.

Each solar unit assembly may stand alone or form part of a larger solar unit plant. Due to the design of each solar unit assembly they can be individually controlled e.g. by electrical engines to hold each assembly in the correct position.

What is claimed is:

1. A solar unit assembly comprising:
    a plurality of solar collector units having the same width arranged in at least one row,
    a receiver,
    a primary support element,
    a plurality of secondary support elements, and
    two side support elements,
    each solar collector unit comprising a flexible reflector element and a support structure supporting said reflector element and said support structure comprising a predefined number of profiles per length unit,
    in which the plurality of solar collector units defines a longitudinal direction and an arcuate direction,
    wherein the receiver is connected to the primary support element, that the primary support element is attached solely to the first row of one or more solar collector units extending in the longitudinal direction and to the side support elements, and that the plurality of secondary support elements are attached solely to the remaining row or rows of one or more solar collector units in the longitudinal direction and to the side support elements,
    wherein the primary support element includes two end sections and is substantially rectangular in cross-section, and
    wherein the primary support element includes four beams extending in the longitudinal direction between the end sections.

2. A solar unit assembly according to claim 1, wherein the primary support element furthermore includes one or more intermediate sections and a number of stay elements extending between an end section and an intermediate section and/or between intermediate sections.

3. A solar unit assembly according to claim 1, wherein the primary support element is provided with engagement means adapted to cooperate with a respective side support element, preferably in the form of flanges provided on the respective end section.

4. A solar unit assembly according to claim 1, wherein each secondary support element includes two end sections and is substantially triangular in cross-section.

5. A solar unit assembly according to claim 4, wherein each secondary support element includes one beam forming an apex beam and two beams forming base beams, the base beams being adapted to face the solar collector panel in the installed condition.

6. A solar unit assembly according to claim 4, wherein the secondary support element furthermore includes one or more intermediate sections and a number of stay elements extending between an end section and an intermediate section and/or between intermediate sections-.

7. A solar unit assembly according to claim 4, wherein the secondary support element is provided with engagement means adapted to cooperate with a respective side support element, preferably in the form of flanges provided on the respective end section.

8. A solar unit assembly according to claim 1, wherein each side support element comprises at least one arcuate beam, and one primary engagement member adapted to cooperate with the primary support element and a set of secondary engagement members adapted to cooperate with a respective secondary support element.

9. A solar unit assembly according to claim 8, wherein the primary engagement member includes a rectangular beam structure and four flanges.

10. A solar unit assembly according to claim 8, wherein each secondary engagement member includes a triangular beam structure and three flanges.

11. A solar unit assembly according to claim 1, wherein the primary support element has a torsional strength and bending resistance that are substantially larger than that of each secondary support element.

12. A solar unit assembly according to claim 11, wherein the ratio of the torsional strength and bending resistance of the primary support element and the secondary support element is in the range of 1.5:1 to 3:1.

13. A solar unit according to claim 11, wherein the torsional strength and bending resistance of the primary support element is at least two times the corresponding values for the secondary support element.

14. A solar unit assembly according to claim 1, wherein the number of rows lies in the interval 2 to 11.

15. A solar unit assembly according to claim 1, wherein the number of rows lies in the interval 5 to 9.

16. A method of constructing a solar unit assembly, comprising the steps of:
    a) forming a plurality of solar collector units each being provided by the steps of
        providing a substrate,
        providing a reflective surface on the substrate to form a reflector element,
        providing a support structure comprising a predefined number of profiles,
        adapting the shape of the reflector element, and
        fixing the shape of the reflector element by connecting the support structure to the reflector element to provide a solar collector unit;
    b) providing a primary support element, a plurality of secondary support elements and two side support elements,
    c) connecting the side support elements on a grounded element, such as a concrete foundation mounted with pylons;
    d) connecting the primary support element to the side support elements;
    e) connecting the plurality of secondary support elements to the side support elements;
    f) attaching a first plurality of solar collector units to the primary support element in a first row in order to cover the full length of the primary support element in a longitudinal direction; and
    g) attaching a second plurality of solar collector units to the plurality of secondary support elements in order to cover the full length of the secondary support elements and to define an arcuate direction;
    to provide the solar unit assembly, wherein the solar unit assembly comprises:
a plurality of solar collector units having the same width arranged in at least one row,
a receiver,
a primary support element,
a plurality of secondary support elements, and
two side support elements,
each solar collector unit comprising a flexible reflector element and a support structure supporting said reflector element and said support structure comprising a predefined number of profiles per length unit,
in which the plurality of solar collector units defines a longitudinal direction and an arcuate direction,
wherein the receiver is connected to the primary support element, that the primary support element is attached solely to the first row of one or more solar collector units extending in the longitudinal direction and to the side support elements, and that the plurality of secondary support elements are attached solely to the remaining row or rows of one or more solar collector units in the longitudinal direction and to the side support elements, and
wherein the primary support element includes two end sections and is substantially rectangular in cross-section, and
wherein the primary support element includes four beams extending in the longitudinal direction between the end sections.

\* \* \* \* \*